Feb. 16, 1954 F. GRAY 2,669,706

CODE SELECTO

Filed May 9, 1950 2 Sheets-Sheet 1

INVENTOR
F. GRAY
BY H. A. Burgess
ATTORNEY

Feb. 16, 1954 F. GRAY 2,669,706

CODE SELECTOR

Filed May 9, 1950 2 Sheets-Sheet 2

INVENTOR
F. GRAY
BY H. A. Burgess
ATTORNEY

Patented Feb. 16, 1954 2,669,706

UNITED STATES PATENT OFFICE 2,669,706

CODE SELECTOR

Frank Gray, East Orange, N. J., assignor to Bell Telephone Laboratories, Incorporated, New York, N. Y., a corporation of New York Application May 9, 1950, Serial No. 160,951

8 Claims. (Cl. 340—164)

This invention relates to code selectors.

It is an object of this invention to select from a series of pulse code groups having a fixed number of bi-valued elements a particular one of the possible permutations of said bi-valued code.

It is a further object to produce at a receiver in a system where signals to be transmitted are represented in accordance with a given code an indication when a particular one of the permutations of said code is received.

Systems are known wherein signals to be transmitted are represented by groups of pulses arranged in accordance with a given code. The signals may comprise a message wave such as in pulse code modulation systems of the type disclosed in an article by L. A. Meacham and E. Peterson, entitled "An Experimental Multichannel Pulse Code Modulation System of Toll Quality," which appears in the Bell System Technical Journal, vol. 27, No. 1, January 1948, at page 1. Alternatively, they may comprise auxiliary signals such as may be used in a communication system for dialing, ringing, or supervisory purposes. The code normally used is the natural binary code wherein the code elements may have one of two values, for example, "on" or "off" pulses. In the binary system, the number of possible permutation code groups is $2^n$, where $n$ is the number of digits in each code group.

The present invention relates to code selectors for recognizing the presence of a predetermined one of the permutation code groups and has utility, for example, either as a code recognizer in a supervisory signaling arrangement for pulse code modulation systems such as is disclosed in a copending application of C. B. H. Feldman, Serial No. 176,106, filed July 27, 1950 which issued as Patent 2,636,081, dated April 21, 1953, or as a channel selector in a radio-telephone system, as is disclosed in a copending application of R. K. Potter, Serial No. 101,029, filed June 24, 1949 which issued as Patent 2,589,130 on March 11, 1952.

In accordance with an illustrative embodiment of the invention, which will be described later in detail, a code generator at a receiver continuously generates a replica of the permutation code group to be selected in synchronism with the received code groups of pulses from which the selection is to be made. The received code groups are compared with the locally generated standard code group, and a condenser is arranged to be charged only when the received code group "on" pulses coincide with the locally generated "on" pulses. At the end of each code group, the condenser is discharged through a resistor. A trigger tube is provided in a circuit with the resistor and will deliver output if the voltage drop across the resistor is great enough. If there have been coincidences with all of the locally generated code elements, the condenser will have received a maximum charge, and the tube will be triggered. The trigger tube is biased so that no output will be delivered unless a coincidence has been registered with all of the locally generated code elements. An indicating device is connected to be energized by the output of the trigger tube.

The invention may be better understood from a consideration of the following detailed description when read in accordance with the attached drawings, in which.

Figure 1:
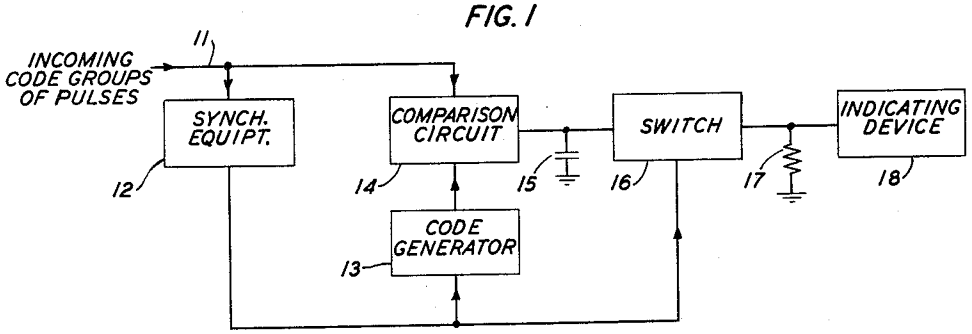
Fig. 1 shows a block schematic diagram illustrative of the present invention.

The invention will first be described in general terms with reference to Fig. 1. Incoming code groups of pulses are received from the line 11. The pulse groups have equal time durations, and one pulse of each group is provided with a distinguishing property which enables the synchronizing equipment 12 to frame the groups, that is, to determine the instant of time at which each group begins or ends. Methods of framing or synchronizing are well known in the art of television and time division multiplex transmission and will not be described herein. A method of synchronizing in a pulse code modulation system is described in J. G. Kreer and E. Peterson Patent 2,527,638, dated October 31, 1950.

The code generator 13 continuously generates a replica of the permutation code group to be recognized. The synchronizing pulse fixes the time at which the code generator begins its sequence of standard pulses. The signals from the line and the output of the local code generator are applied to a comparison circuit 14 which adds one unit of charge to the output condenser 15 when pulses are simultaneously present from both the line and the code generator and subtracts one unit of charge from the condenser when a pulse is received from the line with no standard pulse from the code generator present. When no pulse is received from the line, the charge on the condenser 15 is unchanged regardless of the presence or absence of a pulse from the code generator 13. At the end of each code group of pulses, a pulse from the synchronizing equipment 12 actuates the switch 16, permitting the condenser 15 to discharge through the resistor 17. If the voltage across the resistor exceeds a critical value, the indicating device 18, for example, a bell or a lamp, is triggered to deliver an output; otherwise no signal appears at the output of the indicator.

Figures 2, 2A:
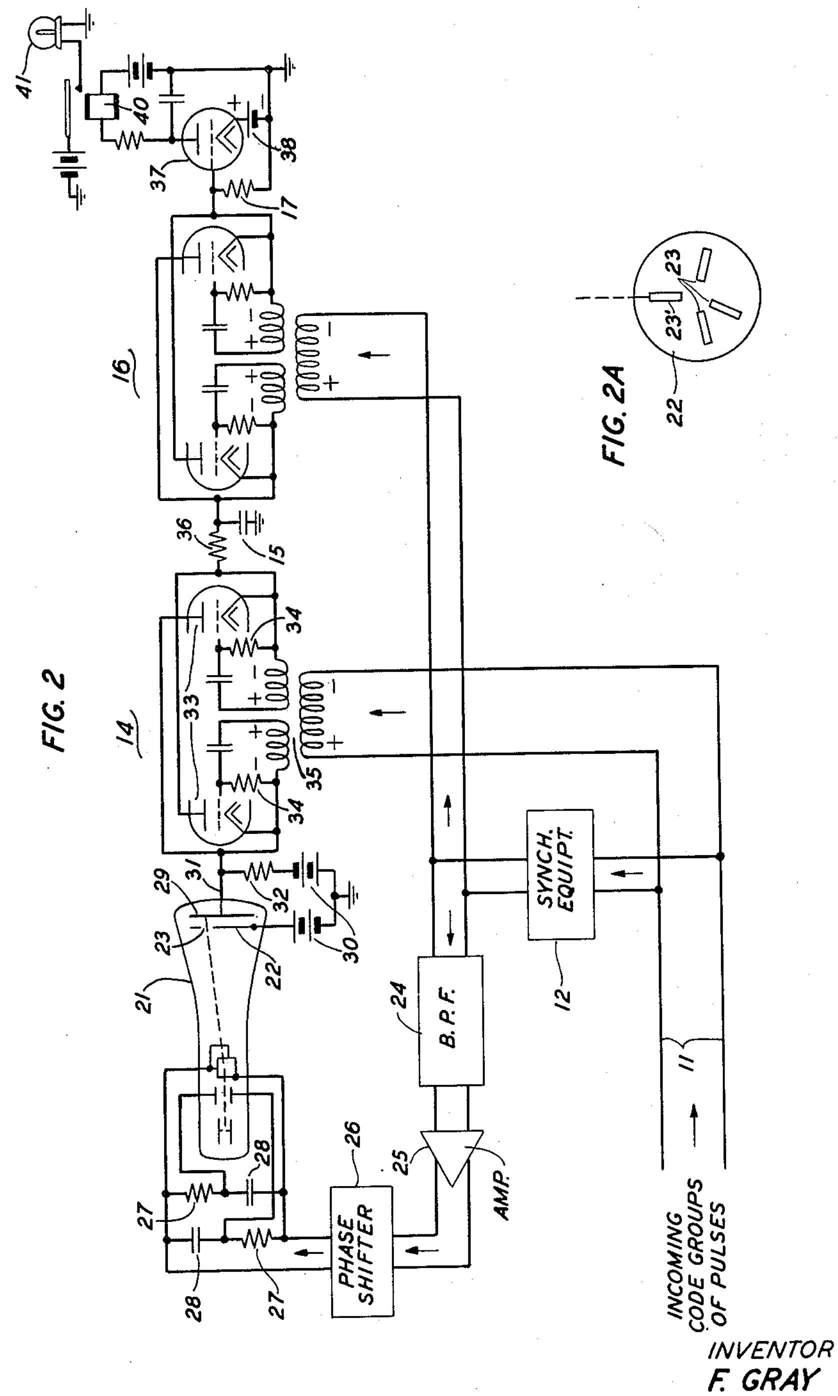
Fig. 2 shows in schematic form the details of an illustrative circuit in accordance with Fig. 1.
Fig. 2A is a plan view of the mask electrode 22 of Fig. 2.

The illustrative embodiment of the invention will now be described in detail with reference to the circuit of Fig. 2. The beam of the cathode-ray tube 21 travels continuously in a circular path over a mask electrode 22. This electrode is shown diagrammatically in Fig. 2A and has radial slots 23 arranged in such a manner that the beam coincides with the slots at the times the standard "on" pulses are required. For illustrative purposes, the mask has been shown as adapted to generate a replica of the permutation code group in a natural binary code of seven digits of 1010110. The sweep for the cathode-ray tube 21 is driven in a circular path by a two-phase sinusoidal field which is derived in a well-known manner from the synchronizing pulse through the band-pass filter 24, amplifier 25, phase shifter 26, and the 90-degree phase splitting circuit comprising the resistors 27 and condensers 28. The sweep is synchronized so that at the beginning of each code group, the electron beam falls on the slot 23'. The output electrode 29 of the cathode-ray tube is made of a material, for example, silver magnesium alloy that has a secondary electron emission ratio of greater than unity, that is, more than one secondary electron will be emitted for each impinging primary electron. Secondary emission from the electrode 29 is aided by the battery 30 having a grounded intermediate tap which biases the mask positive with respect to the secondary emissive plate 29. Therefore, when the electron beam of the cathode-ray tube falls on one of the slots provided in the mask 22, the secondary electrons emitted by the plate 29 will cause a positive pulse to be formed on the output lead 31 due to current flow through the resistor 32, and a replica of the code group to be selected appears as a voltage drop across resistor 32. The use of a collector plate which has a high secondary electron emission ratio eliminates the need of an inverter tube to obtain positive output pulses.

Figure 3:
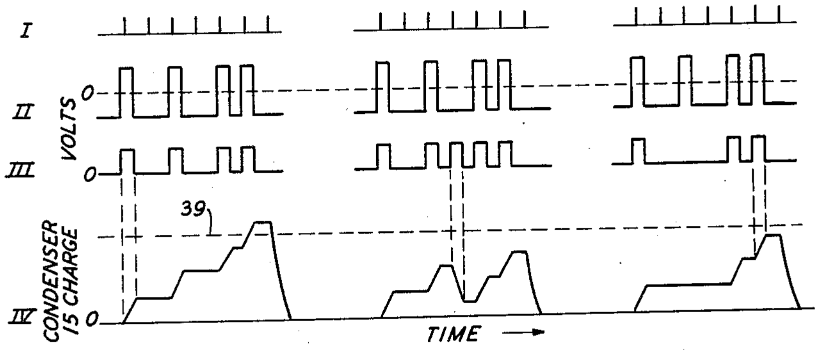
Fig. 3 shows wave forms descriptive of the circuit of Fig. 2.

Due to the negative bias on the plate 29, the output voltage will vary about zero voltage, as is shown in wave form II in Fig. 3, where wave form I illustrates the nominal occurrence times of the seven code elements. The voltage at the output lead 31 is positive during a pulse and negative in the interval between pulses.

The comparison circuit 14 comprises two triodes 33 connected in parallel and poled in opposite direction. The triodes are self-biased to cut-off by the resistors 34 and will conduct only when a positive voltage is applied to their grids. The secondary windings of the transformer 35 are poled in opposite directions, as indicated in the figure by the polarity markings, so that the grids of the two triodes will have the same polarity in the presence of a voltage across the primary of the transformer. The incoming code groups of pulses are applied to the primary of transformer 35 and are positive pulses. Therefore, the triodes 33 will present a low impedance to output from the cathode-ray tube 21 when incoming pulses are present. The plates of the tubes 33 do not conduct when the incoming code pulses are absent.

When incoming code pulses are present at the primary of transformer 35, the positive pulses of the standard code pulse group appearing on the output lead 31 of the cathode-ray tube will charge the condenser 15 through the resistor 36 positively if a standard code pulse is present. If no standard code pulse is present and an incoming code pulse is received, the battery 30 will decrease the positive charge on the condenser. The incoming line pulses act to complete a charging path for condenser 15 from lead 31, and when the path is completed, the condenser will be charged in a sense dependent on the simultaneous presence or absence of a standard pulse.

The condenser 15 is connected to an electronic switch 16, which, in the illustrative embodiment, is similar to the comparison circuit 14. A control pulse derived by the synchronizing equipment 12 is applied to the triode grids of switch 16 at the close of each code pulse group, permitting the condenser 15 to discharge through resistor 17. The resulting current in resistor 17 is proportional to the voltage across the condenser 15 at the close of the pulse group interval. A trigger tube 37 is biased by battery 38 so that the tube is triggered and delivers output only if the charge on the condenser 15 at the end of a code group interval is equal to that acquired when coincidence between standard code pulses and incoming code pulses is complete during a group. Occurrence of a standard code pulse in the absence of a line pulse leads to a smaller value of total charge because, in the absence of a line pulse, the condenser 15 is isolated from the cathode-ray tube 21 by the comparison circuit 14, which acts as an open switch in the absence of a line pulse. Non-occurrence of a standard pulse while a line pulse is present leads to a smaller total charge because the charge on the condenser is reduced by battery 30 in the absence of output from cathode-ray tube 21.

This is illustrated by the wave forms of Fig. 3. Wave form II shows the standard pulses generated by the local code generator which are a replica of the code group to be selected. Wave form III shows received code groups of pulses from which the selection is to be made, and wave form IV illustrates the charging cycle of condenser 15. At each instant of coincidence between a line pulse and a standard pulse, the condenser 15 receives an additional unit of charge. The dotted line 39 indicates the minimum value of charge on condenser 15 which will cause the trigger tube to deliver an output. The left-hand set of wave forms illustrates the charging cycle of condenser 15 when the code to be recognized is received, and coincidence is complete throughout the group. The central set of diagrams in Fig. 3 illustrates the condition when a line pulse is received in the absence of a standard pulse. At this time the charge on the condenser is reduced by virtue of the negative voltage applied by battery 30. The right-hand set of diagrams illustrates the condition when a standard pulse is generated but no line pulse is received. During this interval of non-coincidence, the charge on condenser 15 remains substantially unchanged, as previously explained. It will be noted that unless coincidence is obtained between each standard pulse and a received pulse and unless no line pulses are received at times other than the time of a standard pulse, the charge on condenser 15 will not exceed the value indicated by the dotted line. Therefore, tube 37 will deliver an output only if the permutation code group for which the mask 22 shown in Fig. 2A is received. The output of tube 37 operates the relay 40, which in turn causes an indicating device, which has been illustrated as a lamp 41, to be energized and give an indication that the desired code group has been received.

Figure 4:
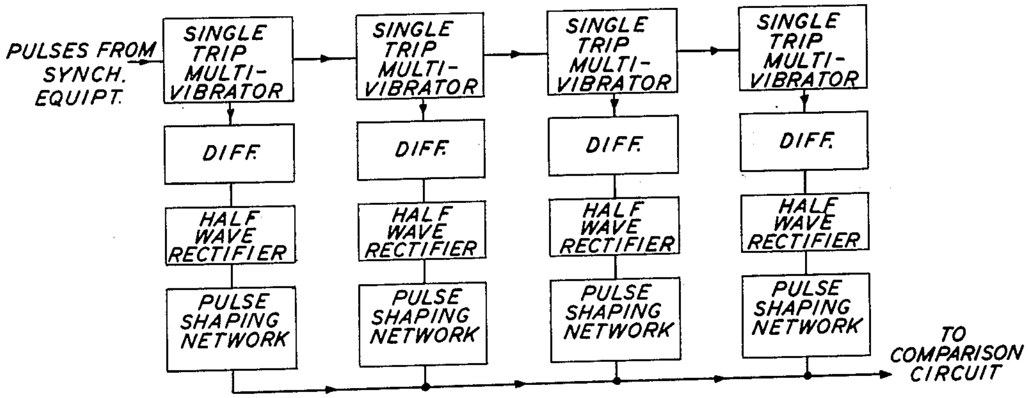
Fig. 4 illustrates in block schematic an alternative code generator to the one shown in Fig. 2.

Fig. 4 illustrates an alternative local code generator. Pulses from the synchronizing equipment act on a chain of single trip multivibrators with relaxation times equal to the differences in time of occurrence of the standard pulses. A portion of the output of each multivibrator is passed through a differentiating circuit, which may comprise, for example, a series condenser and a shunt resistor, and the resulting pips are passed through a half-wave rectifier to pass only the pips occurring at the end of the relaxation time of the multivibrator. These pips are further shaped by the pulse shaping network to form pulses suitable for operation of the comparison circuit 14. The design of multivibrators to give a single square-topped wave of specified duration when triggered by an input pulse is well understood in the art and is explained, for example, in a book by H. J. Reich, Theory and Application of Electron Tubes, McGraw-Hill, 1944, pages 349–364.

Although the invention has been described with reference to particular illustrative embodiments, other embodiments and modifications will readily occur to one skilled in the art without departing from the spirit of the invention.

What is claimed is:

1. A circuit for selecting from a series of pulse code groups of "on"-"off" digit pulses a particular one of the possible permutation code groups which comprises means to generate a replica of the code group to be selected, means to compare each digit of the generated code group with the corresponding digit of each group of said series, charge storing means, means for successively increasing the charge in said charge storing means in response to each successive coincidence between an "on" pulse of said replica and an "on" pulse of said series, an output circuit responsive to the total charge stored in said charge storing means and means for discharging said charge storing means through said output circuit at the end of each of said pulse code groups.

2. In a circuit for recognizing whether or not a code group of pulses having $n$ code elements corresponds to a predetermined one of the possible permutations of said $n$ elements, where $n$ is an integer and where said elements may have one of two values, means for producing in synchronism with said group of pulses a replica of the said predetermined group, charge storing means, means for successively increasing the charge in said charge storing means when said first-named group and said replica simultaneously have a predetermined one of said two values, means for decreasing the charge in said charge storing means when said first-named group and said replica simultaneously have predetermined opposite values, voltage responsive means in a circuit with a resistor, and means to discharge said charge storing means through said resistor at the end of said first-named group.

3. In a system wherein signals are transmitted by code groups of "on"-"off" pulses representative of said signals, means to receive said code groups, and means to select a predetermined permutation code group which comprise means to produce a replica of said predetermined group, means to synchronize said last-named means with said received code groups, a comparison circuit, means to apply said received code groups and said replica to said comparison circuit, a storage capacitor, means responsive to the simultaneous presence in said comparison circuit of "on" pulses of said received group and said replica to successively increase the charge on said capacitor, and means responsive to the simultaneous presence in said comparison circuit of an "on" pulse of said received groups and an "off" pulse of said replica to decrease the charge on said capacitor, voltage responsive means in a circuit with said capacitor and means to discharge said capacitor at the end of each code group.

4. A system in accordance with claim 3 wherein said predetermined code group comprises $n$ "on" pulses, where $n$ is an integer and where the charge on said capacitor is increased one unit for each simultaneous occurrence of "on" pulses, the combination wherein said voltage responsive means is adapted to respond only when the charge on said capacitor exceeds $(n-1)$ units.

5. A circuit for selecting from a train of code groups of "on"-"off" pulses a predetermined code group of pulses which comprises a local generator for producing a replica of the code group of pulses to be selected, means for comparing successive pulses of a code group produced by said generator with successive pulses of each code group in said train, a storage capacitor, means responsive to a coincidence between "on" pulses of said replica and said train for successively increasing the charge on said capacitor, means responsive to a coincidence between an "on" pulse of said train and an "off" pulse of said generator for decreasing the charge on said capacitor, and indicating means responsive to the charge acquired by said storage capacitor during the receipt of said predetermined code group.

6. In a system wherein periodic samples of a message wave to be transmitted are represented by groups of "on"-"off" pulses in accordance with a given code, a selector for recognizing a given code group of pulses from a train of code groups of pulses which comprises means for recurrently producing a replica of the code group of pulses to be recognized in synchronism with the aforementioned train of code groups, capacitive means, means responsive to the presence of an "on" pulse in said train for completing a charging circuit to said capacitive means from said first-named means, a resistor, means for completing a discharging path from said capacitive means through said resistor at the end of each code group, and voltage responsive means connected to be controlled by the voltage across said resistor and biased to respond only if said charging circuit was completed during the previous code group for each code element period that an "on" pulse was produced by said first-named means.

7. The combination in accordance with claim 6 wherein said first-named means applies to said capacitive means, when said charging circuit is completed, a current of a first polarity when said replica comprises an "on" pulse and a current of the opposite polarity when said replica comprises an "off" pulse.

8. A circuit for recognizing a given code group of "on"-"off" pulses from a train of code groups of "on"-"off" pulses which comprises a local generator for producing a replica of the code group to be recognized in synchronism with said train of code groups, capacitive means, means responsive to the presence of an "on" pulse in said train for completing a charging circuit for said capacitive means from said generator, means comprising said generator for applying to said capacitive means, when said charging circuit is completed, a current of a first polarity when an "on" pulse is produced by said generator and a current of the opposite polarity when an "off" pulse is produced by said generator, a resistor, means for causing said capacitive means to be discharged through said resistor at the end of each code group, and voltage responsive means in a circuit with said resistor adapted to respond only when a current of said first polarity has been applied to said capacitive means for each "on" pulse produced by said generator and when no currents of said opposite polarity have been applied to said capacitive means.

FRANK GRAY.

References Cited in the file of this patent

UNITED STATES PATENTS

| Number | Name | Date |
|---|---|---|
| 1,665,622 | Chauveau | Apr. 10, 1928 |
| 1,943,475 | Gurley | Jan. 16, 1934 |
| 2,110,015 | Fitz Gerald | Mar. 1, 1938 |
| 2,396,211 | Skellett | Mar. 5, 1946 |
| 2,441,145 | Hansen | May 11, 1948 |
| 2,497,936 | Finch | Feb. 21, 1950 |
| 2,534,369 | Ress | Dec. 19, 1950 |
| 2,552,174 | Holloway | May 8, 1951 |